United States Patent
Yasuno

(10) Patent No.: US 10,048,906 B2
(45) Date of Patent: Aug. 14, 2018

(54) MOBILE TERMINAL THAT PERFORMS LOGIN PROCESSING, METHOD OF PERFORMING LOGIN PROCESSING, AND STORAGE MEDIUM

(71) Applicant: CANON KABUSHIKI KAISHA, Tokyo (JP)

(72) Inventor: Takashi Yasuno, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/275,934

(22) Filed: Sep. 26, 2016

(65) Prior Publication Data

US 2017/0097797 A1    Apr. 6, 2017

(30) Foreign Application Priority Data

Oct. 2, 2015 (JP) ................. 2015-196779

(51) Int. Cl.
| | |
|---|---|
| *G06F 3/12* | (2006.01) |
| *H04B 17/318* | (2015.01) |
| *H04W 12/08* | (2009.01) |
| *H04N 1/32* | (2006.01) |
| *G06F 21/82* | (2013.01) |
| *H04L 29/06* | (2006.01) |
| *G06F 21/35* | (2013.01) |
| *H04W 4/80* | (2018.01) |

(Continued)

(52) U.S. Cl.
CPC .......... *G06F 3/1222* (2013.01); *G06F 3/1236* (2013.01); *G06F 3/1238* (2013.01); *G06F 3/1292* (2013.01); *G06F 21/35* (2013.01); *G06F 21/82* (2013.01); *H04B 17/318* (2015.01); *H04L 63/107* (2013.01); *H04N 1/32106* (2013.01); *H04W 4/80* (2018.02); *H04W 12/08* (2013.01); *G06F 2221/2111* (2013.01); *H04N 2201/0094* (2013.01); *H04W 76/14* (2018.02); *H04W 88/02* (2013.01)

(58) Field of Classification Search
CPC ..................................................... G06F 3/1222
USPC ....................................................... 358/1.14
See application file for complete search history.

(56) References Cited

U.S. PATENT DOCUMENTS

| | | | |
|---|---|---|---|
| 2013/0086638 A1* | 4/2013 | Itogawa | G06F 21/34 726/4 |
| 2016/0255218 A1* | 9/2016 | Takahashi | H04N 1/00323 358/1.15 |
| 2016/0269384 A1* | 9/2016 | Suga | H04L 63/08 |

FOREIGN PATENT DOCUMENTS

JP    2011227760 A    11/2011

* cited by examiner

*Primary Examiner* — Jacky X Zheng
(74) *Attorney, Agent, or Firm* — Rossi, Kimms & McDowell LLP

(57) ABSTRACT

A mobile terminal capable of reducing time and effort of a user in login processing. When a beacon signal transmitted by an image forming apparatus is received, it is determined whether or not the received signal strength of the received beacon signal is not lower than a predetermined signal strength. If it is determined that the received signal strength is not lower than the predetermined signal strength, it is determined whether or not a difference between the received signal strength of a first beacon signal and the received signal strength of a second beacon signal received after the first beacon signal satisfies a predetermined condition, and if it is determined that the difference satisfies the predetermined condition, user information is transmitted to the image forming apparatus in order to cause a user to log in the image forming apparatus.

11 Claims, 6 Drawing Sheets

(51) Int. Cl.
*H04W 88/02* (2009.01)
*H04W 76/14* (2018.01)

MOBILE TERMINAL THAT PERFORMS LOGIN PROCESSING, METHOD OF PERFORMING LOGIN PROCESSING, AND STORAGE MEDIUM

BACKGROUND OF THE INVENTION

Field of the Invention

The present invention relates to a mobile terminal, a method of performing login processing, and a storage medium, and more particularly to a mobile terminal that performs login processing by performing wireless connection using short-range wireless communication, a method of performing the login processing, and a storage medium.

Description of the Related Art

There has been known an MFP as an image forming apparatus that is capable of performing short-range wireless communication using Bluetooth (registered trademark), NFC (Near Field Communication), or the like, e.g. with a mobile terminal. A user can easily perform wireless connection using short-range wireless communication (hereinafter referred to as "pairing"), by holding a mobile terminal or the like capable of performing short-range wireless communication, over a communication section provided in the MFP. When pairing is performed, in the mobile terminal and the MFP, for example, communication settings are configured for performing wireless communication using Wi-Fi that is wireless communication which enables larger-volume data communication than short-range wireless communication (hereinafter referred to as "Wi-Fi communication"). By performing the communication settings configuration, large-volume print data or the like for performing print processing is transmitted from the mobile terminal to the MFP by Wi-Fi communication, and print processing is performed by the MFP based on the received print data.

Incidentally, the MFP performs login processing as a precondition for a user to use the MFP. In login processing, the MFP acquires user identification information for identifying the user, such as a user ID, and determines whether or not to permit login based on the acquired user identification information. When an IC card having the user identification information is inserted in a card reader provided in the MFP, the MFP acquires the user identification information from the IC card (see e.g. Japanese Patent Laid-Open Publication No. 2011-227760). Further, the MFP is also capable of acquiring large-volume user identification information from e.g. a mobile terminal which is paired with the MFP via Wi-Fi communication.

However, when the MFP acquires the user identification information in login processing, the user is required to perform e.g. an operation for inserting the IC card in the card reader, or holding the mobile terminal over the communication section of the MFP in order to perform pairing.

SUMMARY OF THE INVENTION

The present invention provides a mobile terminal capable of reducing time and effort of a user in login processing, a method of performing the login processing, and a storage medium.

In a first aspect of the present invention, there is provided a mobile terminal, comprising a reception unit configured to receive a beacon signal transmitted by an image forming apparatus, a first determination unit configured to determine whether or not a received signal strength of the beacon signal is not lower than a predetermined signal strength, a second determination unit configured to determine, after it is determined by the first determination unit that the received signal strength is not lower than the predetermined signal strength, whether or not a difference between the received signal strength of a first beacon signal which is received by the reception unit and the received signal strength of a second beacon signal which is received by the reception unit after the first beacon signal satisfies a predetermined condition, and a transmission unit configured to transmit user information to the image forming apparatus in order to cause a user to log in the image forming apparatus in a case where it is determined by the second determination unit that the difference satisfies the predetermined condition.

In a second aspect of the present invention, there is provided a method of performing login processing comprising receiving a beacon signal transmitted by an image forming apparatus, determining whether or not a received signal strength of the beacon signal is not lower than a predetermined signal strength, determining, after it is determined that the received signal strength is not lower than the predetermined signal strength, whether or not a difference between the received signal strength of a first beacon signal received by said receiving and the received signal strength of a second beacon signal received by said receiving after the first beacon signal satisfies a predetermined condition, and transmitting user information to the image forming apparatus in order to cause a user to log in the image forming apparatus in a case where it is determined that the difference satisfies the predetermined condition.

In a third aspect of the present invention, there is provided a non-transitory computer-readable storage medium storing a computer-executable program for executing a method of performing login processing, wherein the method comprises receiving a beacon signal transmitted by an image forming apparatus, determining whether or not a received signal strength of the beacon signal is not lower than a predetermined signal strength, determining, after it is determined that the received signal strength is not lower than the predetermined signal strength, whether or not a difference between the received signal strength of a first beacon signal received by said receiving and the received signal strength of a second beacon signal received by said receiving after the first beacon signal satisfies a predetermined condition, and transmitting user information to the image forming apparatus in order to cause a user to log in the image forming apparatus in a case where it is determined that the difference satisfies the predetermined condition.

According to the present invention, it is possible to reduce time and effort of a user in login processing.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

In the present embodiment, a description will be given of a case in which the present invention is applied to an MFP as an image forming apparatus that is capable of performing short-range wireless communication using Bluetooth (hereinafter referred to as "Bluetooth communication"), but the present invention is not limitedly applied to the MFP, but can be applied to any other image forming apparatus, insofar as it is an image forming apparatus that is capable of performing Bluetooth communication.

Figure 1:
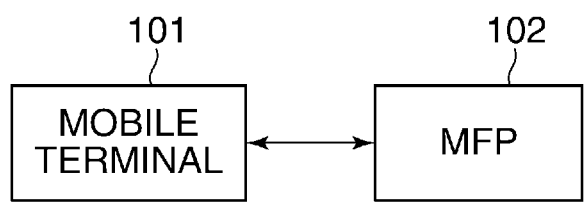
FIG. 1 is a schematic block diagram of a communication system including a mobile terminal according to an embodiment of the present invention.

FIG. 1 is a schematic block diagram of a communication system 100 including a mobile terminal 101 according to an embodiment of the present invention.

Referring to FIG. 1, the communication system 100 includes the mobile terminal 101 and an MFP 102 as an image forming apparatus.

The mobile terminal 101 includes a smartphone, a tablet-type personal computer, and so forth. The mobile terminal 101 is capable of performing short-range wireless communication using NFC or Bluetooth, and wireless communication including Wi-Fi communication and the like. Hereafter, short-range wireless communication using NFC is referred to as NFC communication. Bluetooth communication includes short-range wireless communication using BLE (Bluetooth Low Energy) (hereinafter referred to as "BLE communication"). The MFP 102 is capable of performing various kinds of processing including print processing, scan processing, FAX processing, and so forth, and the above-mentioned various kinds of wireless communication. The mobile terminal 101 and the MFP 102 perform pairing via short-range wireless communication, such as BLE communication or NFC communication, and configure communication settings for performing wireless communication using Wi-Fi which is wireless communication enabling larger-volume data communication than short-range wireless communication. This enables the mobile terminal 101 to transmit large-volume user identification information of a user who has the mobile terminal 101 (hereinafter simply referred to as the "user identification information of the mobile terminal 101") to the MFP 102. As a result, in the communication system 100, login processing is enabled for the user to log in the MFP 102 using the mobile terminal 101. In the communication system 100, for example, when pairing is performed using BLE communication, the MFP 102 periodically transmits a beacon signal used for pairing. The beacon signal includes device identification information for identifying the MFP 102 and information on the strength of radio waves for transmitting the beacon signal (hereinafter referred to as the "transmitted signal strength"). Upon receipt of the beacon signal transmitted from the MFP 102, the mobile terminal 101 performs pairing with the MFP 102 based on the received beacon signal. Further, the mobile terminal 101 is capable of measuring a distance from the MFP 102 based on the strength of radio waves of the received beacon signal (hereinafter referred to as the "received signal strength") and the information on the transmitted signal strength included in the received beacon signal.

Figure 2:
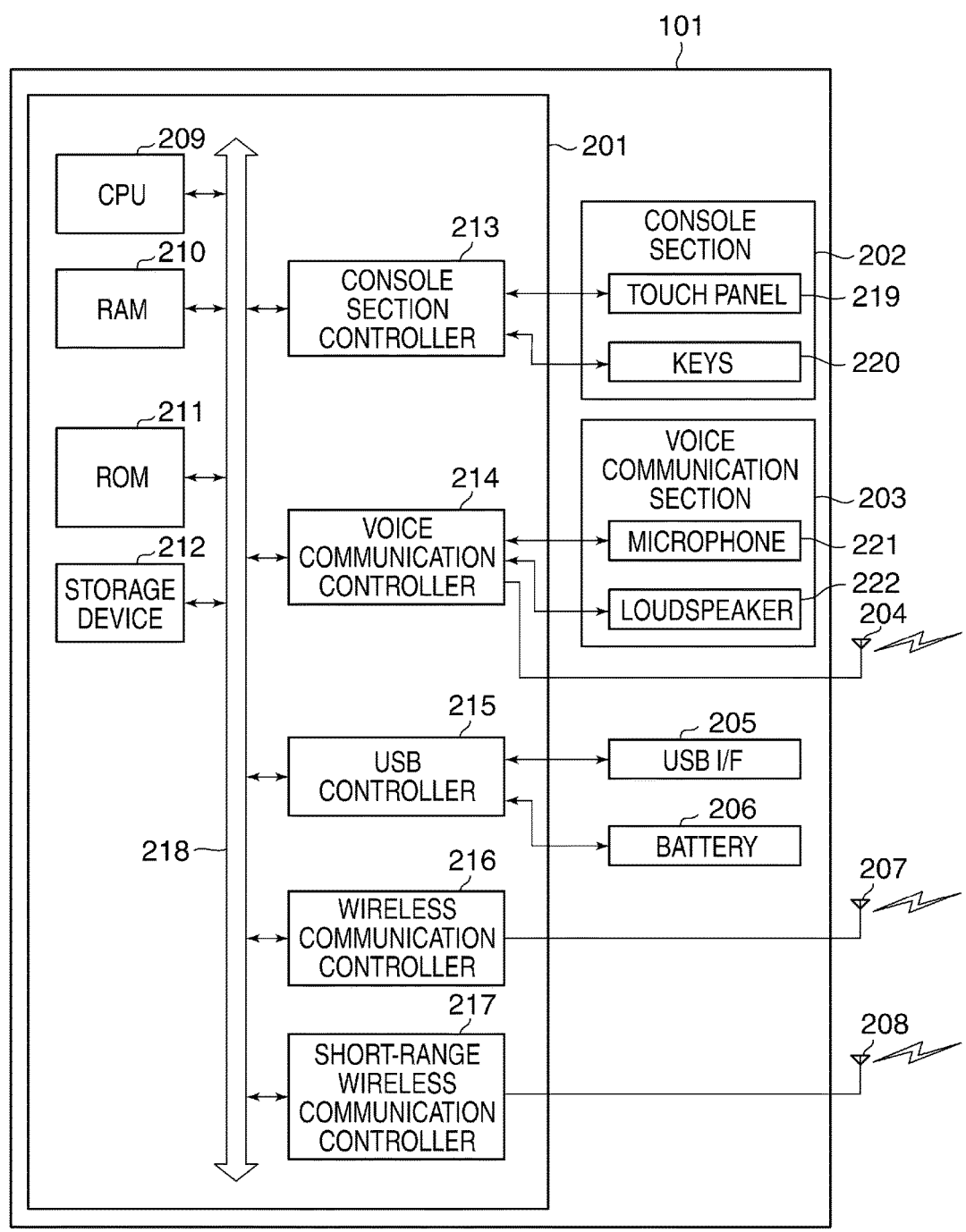
FIG. 2 is a schematic block diagram of the mobile terminal appearing in FIG. 1.

FIG. 2 is a schematic block diagram of the mobile terminal 101 appearing in FIG. 1.

Referring to FIG. 2, the mobile terminal 101 includes a controller 201, a console section 202, a voice communication section 203, a voice antenna 204, a USB interface 205, a battery 206, a wireless communication antenna 207, and a short-range wireless communication antenna 208. The controller 201 is connected to the console section 202, the voice communication section 203, the voice antenna 204, the USB interface 205, the battery 206, the wireless communication antenna 207, and the short-range wireless communication antenna 208. The controller 201 includes, as components, a CPU 209, a RAM 210, a ROM 211, a storage device 212, a console section controller 213, a voice communication controller 214, a USB controller 215, a wireless communication controller 216, and a short-range wireless communication controller 217. The above-mentioned components are interconnected via a system bus 218. The console section 202 includes a touch panel 219 and various keys 220, and the voice communication section 203 includes a microphone 221 and a loudspeaker 222.

The controller 201 controls the overall operation of the mobile terminal 101. The CPU 209 controls the components connected to the system bus 218 by executing various programs stored in the ROM 211 and the like to thereby perform various kinds of processing. The RAM 210 is used as a work area for the CPU 209, and is also used as an area for temporarily storing various data. In the present embodiment, the RAM 210 stores measured values of the received signal strength of a beacon signal, which are measured in a control process, described hereinafter with reference to FIG. 4. The ROM 211 stores various programs used by the CPU 209 and various data. In the present embodiment, the ROM 211 stores user identification information of the mobile terminal 101, which is used in the control process, described hereinafter with reference to FIG. 4. The storage device 212 is a nonvolatile memory for storing large-volume programs, large-volume data, etc. The console section controller 213 performs data communication with the console section 202. For example, the console section controller 213 sends image data for displaying various images to the console section 202. Further, the console section controller 213 acquires setting information from the console section 202, which is set by a user who operates the touch panel 219 and required ones of the various keys 220 of the console section 202, and converts the acquired setting information to data which can be read by the CPU 209. The voice communication controller 214 performs data communication with the voice communication section 203. For example, the voice communication controller 214 converts voice of the user received via the microphone 221 of the voice communication section 203 to radio waves for transmitting the voice to an external apparatus as a communication destination, and outputs the radio waves to the external apparatus via the voice antenna 204. Further, the voice communication controller 214 converts radio waves received from an external apparatus to voice, and outputs the voice via the speaker 222. The USB controller 215 performs data communication with an external device connected via the USB interface 205, and supplies electric power to the external device. The wireless communication controller 216 performs wireless communication, such as Wi-Fi communication, e.g. with the MFP 102 via the wireless communication antenna 207. The short-range wireless communication controller 217 performs short-range wireless communication, such as BLE communication, e.g. with the MFP 102 via the short-range wireless communication antenna 208. The console section 202 displays a configuration screen for configuring various settings of the mobile terminal 101, a notification screen for notifying the user various kinds of information, and so forth. In the present embodiment, for example, the console section 202 displays various screens, including screens described hereinafter with reference to FIGS. 5A to 5D. The voice communication section 203 performs voice communication processing with an external apparatus via the voice antenna 204. The USB interface 205 performs data communication with an external device connected thereto. The battery 206 supplies electric power to the whole mobile terminal 101.

Figure 3:
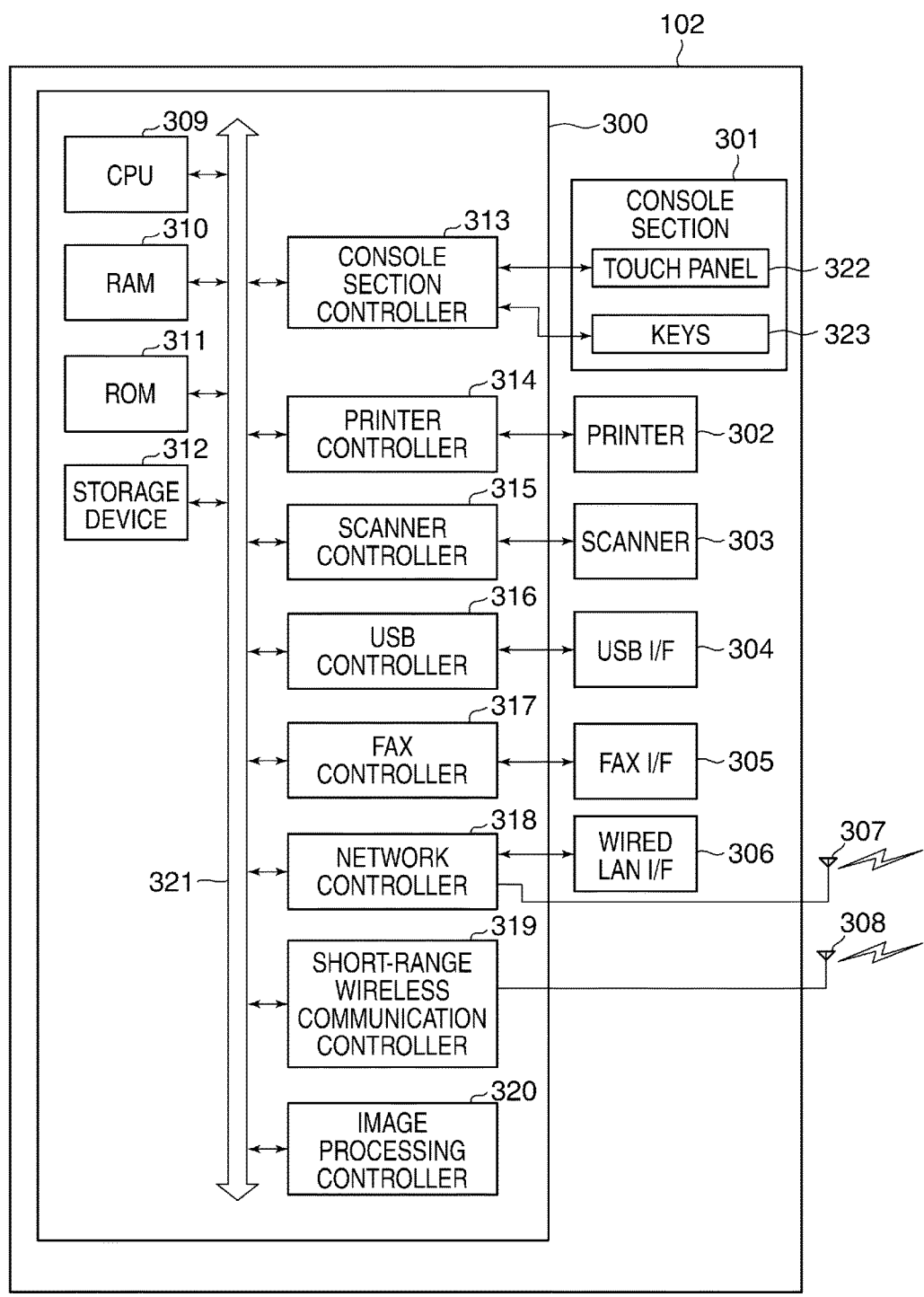
FIG. 3 is a schematic block diagram of an MFP appearing in FIG. 1.

FIG. 3 is a schematic block diagram of the MFP 102 appearing in FIG. 1.

Referring to FIG. 3, the MFP 102 includes an MFP controller 300, a console section 301, a printer 302, a scanner 303, a USB interface 304, a FAX interface 305, a wired LAN interface 306, a wireless communication antenna 307, and a short-range wireless communication antenna 308. The MFP controller 300 is connected to the console section 301, the printer 302, the scanner 303, the USB interface 304, the FAX interface 305, the wired LAN interface 306, the wireless communication antenna 307, and the short-range wireless communication antenna 308. The MFP controller 300 includes, as components, a CPU 309, a RAM 310, a ROM 311, a storage device 312, a console section controller 313, a printer controller 314, a scanner controller 315, a USB controller 316, a FAX controller 317, a network controller 318, a short-range wireless communication controller 319, and an image processing controller 320. The above-mentioned components are interconnected via a system bus 321. The console section 301 includes a touch panel 322 and various keys 323.

The MFP controller 300 controls the overall operation of the MFP 102. The CPU 309 controls the components connected to the system bus 321 by executing various programs stored in the ROM 311 and the like to thereby perform various kinds of processing. The RAM 310 is used as a work area for the CPU 309, and is also used as an area for temporarily storing various data. The ROM 311 stores various programs used by the CPU 309 and various data. The storage device 312 is a nonvolatile memory for storing large-volume programs, large-volume data, etc. The console section controller 313 performs data communication with the console section 301. For example, the console section controller 313 sends image data for displaying various images to the console section 301. Further, the console section controller 313 acquires setting information from the console section 301, which is set by a user who operates the touch panel 322 and required ones of the various keys 323 of the console section 301, and converts the acquired setting information to data which can be read by the CPU 309. The printer controller 314 performs data communication with the printer 302. For example, the printer controller 314 transmits print data to be subjected to print processing to the printer 302. The scanner controller 315 controls various sensors, not shown, provided on the scanner 303, including an original detection sensor and an image reading sensor, and performs scan processing. The USB controller 316 performs data communication with an external device connected thereto via the USB interface 304. The FAX controller 317 performs data communication with the FAX interface 305. The network controller 318 performs wired communication with an external apparatus connected via the wired LAN interface 306. Further, the network controller 318 performs wireless communication, such as Wi-Fi communication, e.g. with the mobile terminal 101 via the wireless communication antenna 307. The short-range wireless communication controller 319 performs short-range wireless communication, such as BLE communication, e.g. with the mobile terminal 101 via the short-range wireless communication antenna 308. The image processing controller 320 converts an image read by the scanner 303 to image data, and performs image processing on the image data, such as magnification, reduction, and monochrome image processing. The console section 301 displays e.g. a configuration menu for configuring various settings of the MFP 102. The printer 302 performs print processing, and the scanner 303 performs scan processing. The USB interface 304 performs data communication with an external device connected thereto. The FAX interface 305 performs FAX communication with an external apparatus that can perform FAX communication.

Figure 4:
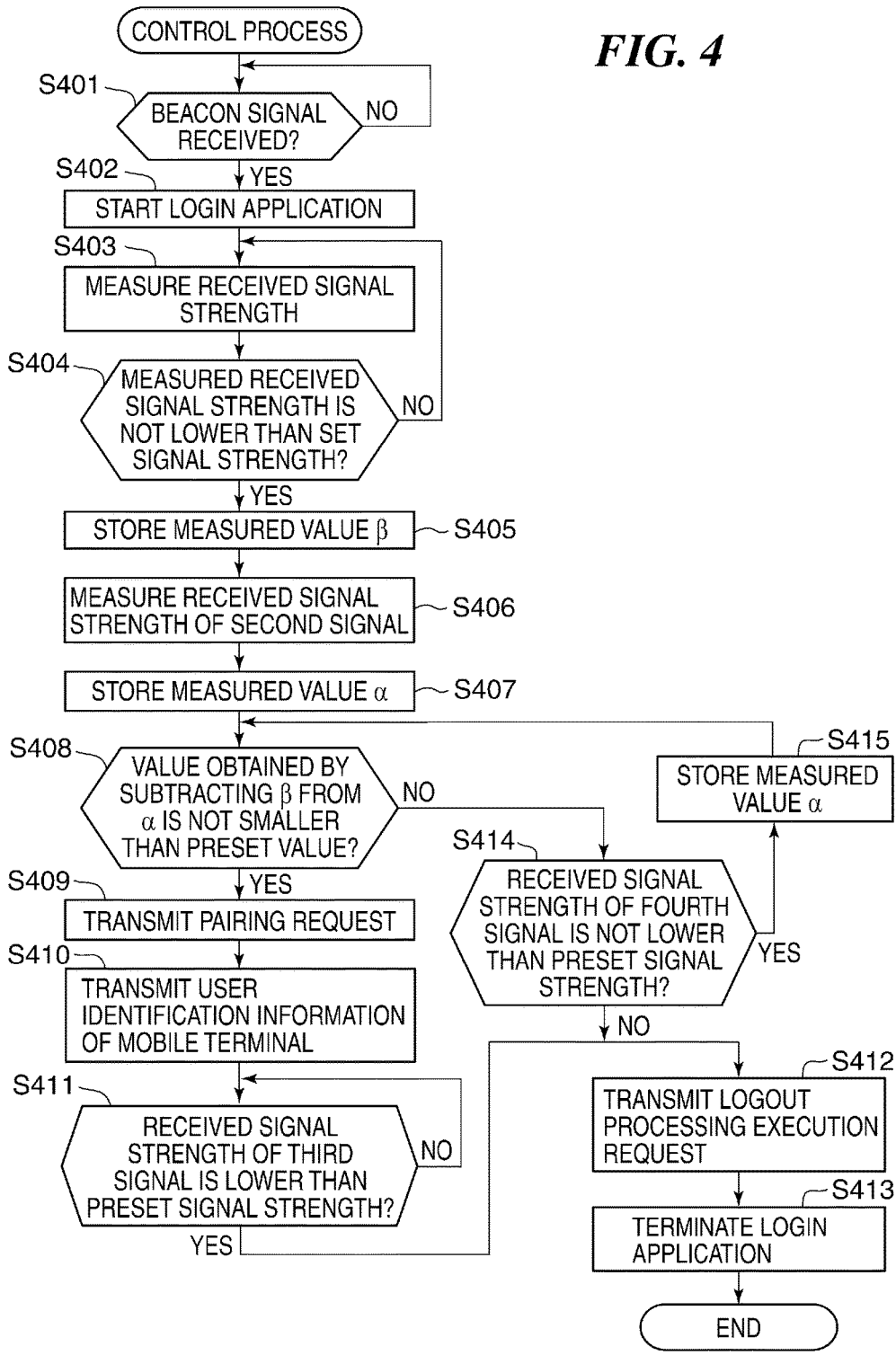
FIG. 4 is a flowchart of a control process performed by the mobile terminal appearing in FIG. 1.

FIG. 4 is a flowchart of the control process performed by the mobile terminal 101 appearing in FIG. 1.

The process in FIG. 4 is performed by the CPU 209, appearing in FIG. 2, which executes the various programs stored in the ROM 211. Further, the process in FIG. 4 is performed assuming that Bluetooth communication is used, and BLE communication is used as an example of Bluetooth communication.

Here, when a user logs in the MFP 102 using the mobile terminal 101, the MFP 102 has to acquire user identification information of the mobile terminal 101 from the mobile terminal 101. Although the MFP 102 can acquire large-volume user identification information from the paired mobile terminal 101 by Wi-Fi communication, NFC communication is sometimes used when pairing is performed. The communication distance in NFC communication is shorter than that in Bluetooth communication, and hence, to perform pairing, the user has to take the time and effort to perform an operation of holding the mobile terminal 101 over the MFP 102 in the vicinity of the short-range wireless communication antenna 308 of the MFP 102.

To cope with this, in the present embodiment, in a case where a first signal of beacon signals periodically transmitted via Bluetooth communication, which has a received signal strength not lower than a strength set for the mobile terminal 101 in advance (hereinafter referred to as the "set signal strength") is received, login processing for logging in the MFP 102 is performed, based on a difference between the received signal strength of the first signal and a received signal strength of a second signal which is received after receiving the first signal.

Referring to FIG. 4, first, upon receipt of a beacon signal transmitted from the MFP 102 (step S401), the CPU 209 starts a login application used when the user logs in the MFP 102 using the mobile terminal 101 (step S402). In the present embodiment, in the step S402, a configuration screen 501 shown in FIG. 5A, on which the user can set the start of the login application, may be displayed on the console section 202. Then, the CPU 209 measures the received signal strength of the received beacon signal (step S403).

Figure 6:
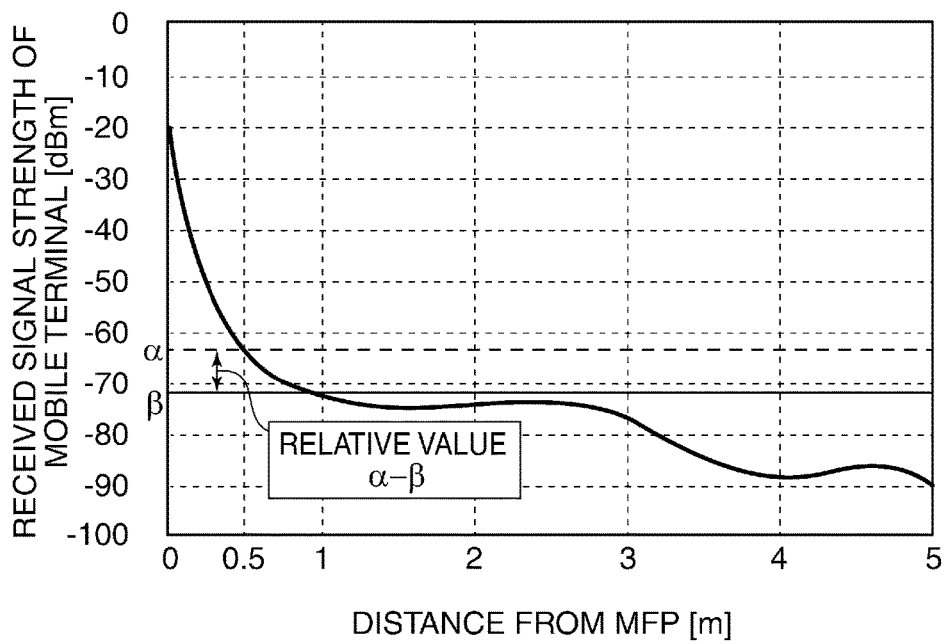
FIG. 6 is a diagram useful in explaining characteristics of the received signal strength of the mobile terminal appearing in FIG. 1.

FIG. 6 is a diagram useful in explaining characteristics of the received signal strength of the mobile terminal 101 appearing in FIG. 1. A horizontal axis represents a distance from the MFP 102, and a vertical axis represents the received signal strength of the mobile terminal 101. The received signal strength shows a value which becomes smaller as the distance from the MFP 102 is larger. Then, the CPU 209 determines whether or not the measured received signal strength is not lower than the set signal strength (not lower than a threshold value) (step S404). The characteristics of the received signal strength are different e.g. depending on the model of the mobile terminal or an accessory externally mounted on the mobile terminal. Further, the characteristics of the received signal strength are also different, even between mobile terminals of the same model, depending on a situation in which a transmitting source of the beacon signal is disposed. Therefore, the strength of a signal which can be positively received by the mobile terminal capable of performing short-range wireless communication is set as the set signal strength. For example, the set signal strength is set to a range of −80 dBm to −70 dBm, which are signal strengths corresponding to a range of 1 m to 3 m in the distance from the MFP 102, as shown in the characteristics of the received signal strength of the mobile terminal 101 in FIG. 6.

Figure 7:
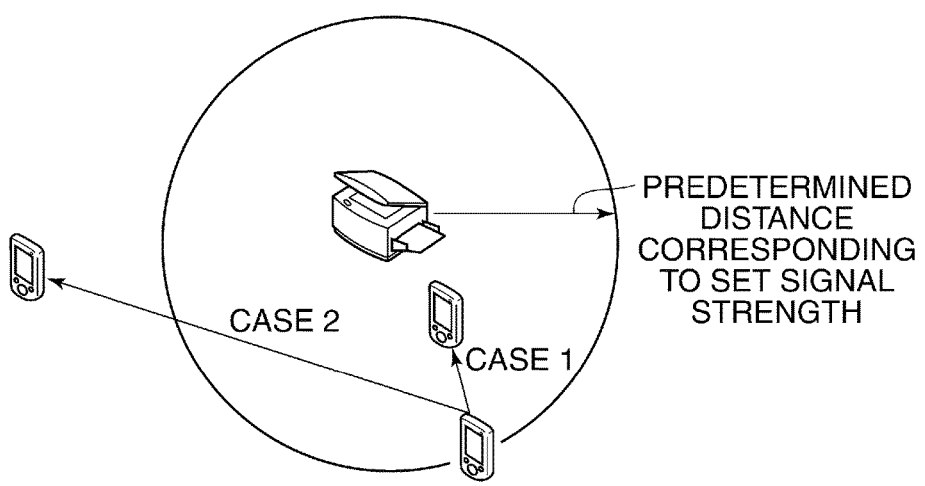
FIG. 7 is a diagram useful in explaining a case where the mobile terminal appearing in FIG. 1 is moving closer to the MFP.

If it is determined in the step S404 that the received signal strength of the received beacon signal is lower than the set signal strength, the CPU 209 returns to the step S403. On the other hand, if it is determined in the step S404 that the received signal strength of the received beacon signal is not lower than the set signal strength, the CPU 209 sets the same as the first signal, and stores the received signal strength of the first signal in the RAM 210 as a measured value β (step S405). Then, the CPU 209 sets a beacon signal received when a predetermined time period of e.g. in a range of one msec to one sec or so elapses after receiving the first signal, as the second signal, and measures the received signal strength of the second signal (step S406). Then, the CPU 209 stores the received signal strength of the second signal in the RAM 210 as a measured value α (step S407). Then, the CPU 209 determines whether or not a value obtained by subtracting the measured value β from the measured value α is not smaller than a preset value (step S408). As the preset value, a value is set with which it is possible to detect that the mobile terminal 101 is moving closer to the MFP 102 as indicated by a case 1 in FIG. 7, based on the characteristics of the received signal strength, which are different depending on each mobile terminal, and for example, a value of 10 dBm is set. With this, it is possible to positively detect that a mobile terminal is moving closer to the MFP 102, even though the characteristics of the received signal strength are different depending on each mobile terminal.

If it is determined in the step S408 that the value obtained by subtracting the measured value β from the measured value α is not smaller than the preset value, the CPU 209 judges that the mobile terminal 101 is moving closer to the MFP 102. Then, the CPU 209 transmits a pairing request to the MFP 102 via BLE communication (step S409). This causes pairing to be performed between the mobile terminal 101 and the MFP 102 via BLE communication. Then, the CPU 209 configures communication settings for Wi-Fi communication which enables larger-volume data communication than in BLE communication. More specifically, the CPU 209 acquires various kinds of setting information, such as an SSID (Service Set Identifier) for performing Wi-Fi communication with the MFP 102, from the MFP 102, and sets the acquired various kinds of setting information in the mobile terminal 101. This enables Wi-Fi communication between the mobile terminal 101 and the MFP 102. After that, the CPU 209 transmits the user identification information of the mobile terminal 101, stored in the ROM 211, to the MFP 102 by Wi-Fi communication (step S410) (login execution step). Upon receipt of the user identification information, the MFP 102 performs login processing based on the received user identification information. Then, upon detection of completion of login processing performed by the MFP 102, the CPU 209 displays a notification screen 502 shown in FIG. 5B on the console section 202, which notifies the user of completion of login processing. Then, the CPU 209 measures the received signal strength of a third signal which is a beacon signal received after completion of login processing, and determines whether or not the received signal strength of the third signal is lower than the set signal strength (step S411). The CPU 209 executes the step S411 until a beacon signal having the received signal strength lower than the set signal strength is received. If the received signal strength of the third signal is lower than the set signal strength (YES to the step S411), the CPU 209 judges that the mobile terminal 101 is away from the MFP 102 by a predetermined distance corresponding to the set signal strength or more, as indicated by a case 2 in FIG. 7. After that, the CPU 209 transmits a request for performing logout processing to the MFP 102 (step S412) (logout execution step). Upon receipt of the logout execution request, the MFP 102 performs logout processing. Then, the CPU 209 transmits a pairing cancel request to the MFP 102, followed by terminating the login application (step S413). In the present embodiment, before terminating the login application, a configuration screen 503 shown in FIG. 5C, on which the user can set termination of the login application, may be displayed on the console section 202. Then, the CPU 209 executes the step S413, followed by terminating the present process.

If it is determined in the step S408 that a value obtained by subtracting the measured value β from the measured value α is smaller than the preset value, the CPU 209 judges that the mobile terminal 101 is not moving closer to the MFP 102. Then, the CPU 209 receives a beacon signal as a fourth signal, and measures the received signal strength of the fourth signal to thereby determine whether or not the received signal strength of the fourth signal is not lower than the set signal strength (step S414).

If it is determined in the step S414 that the received signal strength of the fourth signal is not lower than the set signal strength, the CPU 209 stores the received signal strength of the fourth signal in the RAM 210 as the measured value α (step S415), and returns to the step S408. On the other hand, if it is determined in the step S414 that the received signal strength of the fourth signal is lower than the set signal strength, the CPU 209 judges that the mobile terminal 101 is away from the MFP 102 by the predetermined distance corresponding to the set signal strength or more, as indicated by the case 2 in FIG. 7. Then, the CPU 209 executes the step S412 et seq., followed by terminating the present process.

According to the above-described process in FIG. 4, when the first signal having the received signal strength not lower than the set signal strength is received, login processing for logging in the MFP 102 is performed based on the difference between the received signal strength of the first signal and the received signal strength of the second signal received after receiving the first signal. That is, login processing is performed only based on the received signal strength of each signal received by the mobile terminal 101. This causes login processing to be performed without requiring a user to operate the mobile terminal 101 or the like, and hence it is possible to reduce the time and effort of the user in login processing.

Further, in the above-described process in FIG. 4, when a value obtained by subtracting the received signal strength of the first signal (measured value β) from the received signal strength of the second signal (measured value α) is not smaller than the preset value, login processing for logging in the MFP 102 is performed. Here, a case where a value obtained by subtracting the received signal strength of the first signal from the received signal strength of the second signal is not smaller than the preset value is a case where the mobile terminal 101 is moving closer to the MFP 102. In the case where the mobile terminal 101 is moving closer to the MFP 102, there is a high possibility that the user desires to use the MFP 102, and login processing for logging in the MFP 102 is performed in this case, and hence it is possible to positively cause the user who desires to use the MFP 102 to log in the MFP 102.

In the above-described process in FIG. 4, when the received signal strength of the third signal, which is received after completion of login processing for logging in the MFP 102, is lower than the set signal strength, logout processing for logging out from the MFP 102 is performed. This makes it possible to prevent the logged-in state from being unnecessarily continued by a user who has forgotten to perform logout processing.

Further, in the above-described process in FIG. 4, wireless communication includes BLE communication, and hence it is possible to perform login processing with low power.

While the present invention has been described with reference to exemplary embodiments, it is to be understood that the invention is not limited to the disclosed exemplary embodiments.

For example, in a case it is detected that a user holding the mobile terminal 101 stays at a location where the user can operate the MFP 102 by his/her hand, for a predetermined time period or more, e.g. one sec or more, the CPU 209 may perform login processing for logging in the MFP 102. Here, the case where a user stays at a location where the user can operate the MFP 102 by his/her hand is none other than a case where the user intends to use the MFP 102. In this case, login processing for logging in the MFP 102 is performed, and hence it is possible to positively cause the user who intends to use the MFP 102 to log in the MFP 102.

Figure 5A:
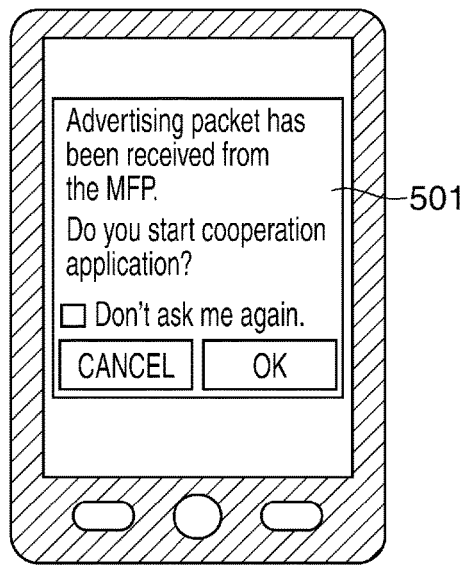
FIG. 5A is a diagram showing a configuration screen displayed on a console section appearing in FIG. 2, for allowing a user to make a setting as to the start of a login application.
Figure 5B:
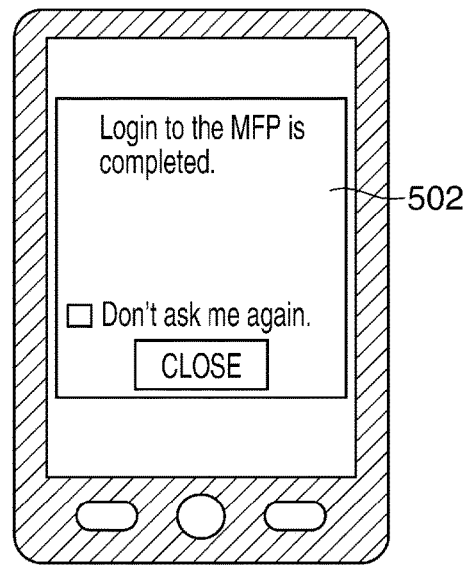
FIG. 5B is a diagram showing a notification screen displayed on the console section appearing in FIG. 2, for notifying the user of completion of login processing.
Figure 5C:
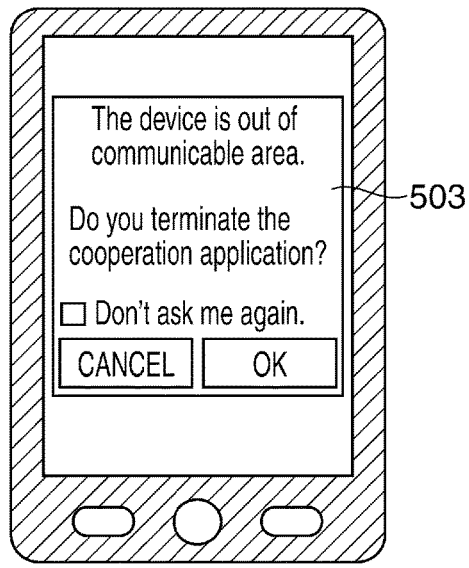
FIG. 5C is a diagram showing a configuration screen displayed on the console section appearing in FIG. 2, for allowing the user to make a setting as to the termination of the login application.
Figure 5D:
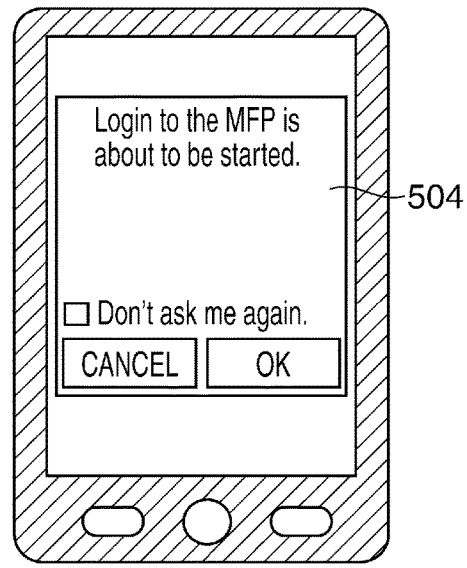
FIG. 5D is a diagram showing a confirmation screen displayed on the console section appearing in FIG. 2, for prompting the user to confirm execution of login processing.

Further, in the present embodiment, a confirmation screen 504 for prompting the user to confirm execution of login processing may be displayed on the console section 202 as shown in FIG. 5D. This makes it possible to give a user an opportunity to determine whether or not login processing about to be performed is processing desired by the user, whereby it is possible to prevent login processing not desired by the user from being performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

This application claims the benefit of Japanese Patent Application No. 2015-196779 filed Oct. 2, 2015, which is hereby incorporated by reference herein in its entirety.

What is claimed is:

1. A mobile terminal comprising:
a communication controller configured to receive beacon signals transmitted by an image forming apparatus and transmit user information to the image forming apparatus; and
a processor configured to implement instructions stored in a memory and execute:
a first determining task that determines whether or not a received signal strength of a received beacon signal is not lower than a predetermined signal strength;
a second determining task that determines, after the first determining task determines that the received signal strength is not lower than the predetermined signal strength, whether or not a difference between the received signal strength of a first beacon signal received by the communication controller and the received signal strength of a second beacon signal received by the communication controller after receiving the first beacon signal satisfies a predetermined condition, wherein the difference reflects a change amount of a distance between the mobile terminal and the image forming apparatus; and
a transmission task that transmits the user information to the image forming apparatus, using the communication controller, for logging in to the image forming apparatus in a case where the second determining task determines that the difference satisfies the predetermined condition.

2. The mobile terminal according to claim 1, wherein the communication controller receives the second beacon signal when a predetermined time period elapses after receiving the first beacon signal.

3. The mobile terminal according to claim 1, wherein the processor is further configured to execute:
a third determining task that determines, after the user logs in the image forming apparatus, whether or not the received signal strength of the received beacon signal satisfies a logout condition for causing the user to log out from the image forming apparatus,
wherein in a case where the third determining task determines that the received signal strength of the received beacon signal satisfies the logout condition, the transmission task transmits a logout request to the image forming apparatus.

4. The mobile terminal according to claim 1, wherein the beacon signal received by the transmission controller from the image forming apparatus is based on BLE (Bluetooth Low Energy) communication.

5. The mobile terminal according to claim 1, wherein in a case where a value obtained by subtracting the received signal strength of the first beacon signal from the received signal strength of the second beacon signal is not lower than a predetermined value, the second determining task determines that the difference satisfies the predetermined condition.

6. A method of performing login processing for a mobile terminal, the method comprising:
   a receiving step of receiving, using the mobile terminal, beacon signals transmitted by an image forming apparatus;
   a first determining step of determining whether or not a received signal strength of a received beacon signal is not lower than a predetermined signal strength;
   a second determining step of determining, after the first determining step determines that the received signal strength is not lower than the predetermined signal strength, whether or not a difference between the received signal strength of a first beacon signal received in the receiving step and the received signal strength of a second beacon signal received in the receiving step after receiving the first beacon signal satisfies a predetermined condition, wherein the difference reflects a change amount of a distance between the mobile terminal and the image forming apparatus; and
   a transmitting step of transmitting user information to the image forming apparatus for logging in to the image forming apparatus in a case where the second determining step determines that the difference satisfies the predetermined condition.

7. The method according to claim 6, wherein the receiving step receives the second beacon signal when a predetermined time period elapses after receiving the first beacon signal.

8. The method according to claim 6, further comprising:
   a third determining step of determining, after a user logs in the image forming apparatus, whether or not the received signal strength of the received beacon signal satisfies a logout condition for logging out from the image forming apparatus,
   wherein the transmitting step transmits, in a case where the third determining step determines that the received signal strength of the received beacon signal satisfies the logout condition, a logout request to the image forming apparatus.

9. The method according to claim 6, wherein the beacon signal received in the receiving step from the image forming apparatus is based on BLE (Bluetooth Low Energy) communication.

10. The method according to claim 6, wherein in a case where a value obtained by subtracting the received signal strength of the first beacon signal from the received signal strength of the second beacon signal is not lower than a predetermined value, the second determining step determines that the difference satisfies the predetermined condition.

11. A non-transitory computer-readable storage medium storing a computer-executable program executable by a processor of a mobile terminal to execute a method of performing login processing, wherein the method comprises:
   a receiving step of receiving beacon signals transmitted by an image forming apparatus;
   a first determining step of determining whether or not a received signal strength of a received beacon signal is not lower than a predetermined signal strength;
   a second determining step of determining, after the first determining step determines that the received signal strength is not lower than the predetermined signal strength, whether or not a difference between the received signal strength of a first beacon signal received in the receiving step and the received signal strength of a second beacon signal received in the receiving step after receiving the first beacon signal satisfies a predetermined condition, wherein the difference reflects a change amount of a distance between the mobile terminal and the image forming apparatus; and
   a transmitting step of transmitting user information to the image forming apparatus for logging in to the image forming apparatus in a case where the second determining step determines that the difference satisfies the predetermined condition.

* * * * *